United States Patent
Georgin (10) Patent No.: US 10,147,331 B1
(45) Date of Patent: Dec. 4, 2018

(54) ASSESSING RUNWAY SURFACE CONDITIONS

(71) Applicant: GOODRICH CORPORATION, Charlotte, NC (US)

(72) Inventor: Marc Georgin, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 38 days.

(21) Appl. No.: 15/595,534

(22) Filed: May 15, 2017

(51) Int. Cl.
| | |
|---|---|
| *G06F 19/00* | (2018.01) |
| *G08G 5/02* | (2006.01) |
| *G08G 5/00* | (2006.01) |
| *G05D 1/00* | (2006.01) |
| *B64D 45/04* | (2006.01) |

(52) U.S. Cl.
CPC .......... *G08G 5/025* (2013.01); *B64D 45/04* (2013.01); *G05D 1/0083* (2013.01); *G08G 5/0021* (2013.01); *G08G 5/0073* (2013.01); *B60W 2510/069* (2013.01); *B60W 2510/081* (2013.01); *B60W 2510/184* (2013.01)

(58) Field of Classification Search
CPC ....... G08G 5/025; B64D 45/04; G05D 1/0083
See application file for complete search history.

(56) References Cited

U.S. PATENT DOCUMENTS

| | | | | |
|---|---|---|---|---|
| 3,556,614 A | * | 1/1971 | Stiegerwald | B60T 8/17633 188/181 A |
| 5,918,951 A | * | 7/1999 | Rudd, III | B60T 8/17616 188/181 T |
| 7,286,909 B2 | | 10/2007 | Darke | |
| 9,299,261 B2 | | 3/2016 | Jones | |
| 2007/0132311 A1 | | 6/2007 | Giazotto | |
| 2009/0276133 A1 | | 11/2009 | May et al. | |
| 2011/0144875 A1 | | 6/2011 | Rado | |

FOREIGN PATENT DOCUMENTS

| | | |
|---|---|---|
| EP | 0936116 | 8/1999 |
| EP | 2821302 | 1/2015 |
| EP | 2873574 | 5/2015 |
| WO | 9850262 | 11/1998 |

OTHER PUBLICATIONS

European Patent Office, European Search Report dated Aug. 16, 2018 in Application No. 18172326.3-1012.

* cited by examiner

Primary Examiner — Adam M Alharbi
(74) Attorney, Agent, or Firm — Snell & Wilmer, L.L.P.

(57) ABSTRACT

Systems and methods for assessing runway conditions are disclosed. The system may comprise a brake control unit having an internal inertial sensor. The brake control unit may be configured to calculate a runway coefficient of friction to assess surface conditions of the runway. The brake control unit may monitor braking in an aircraft to detect a skid condition. In response to detecting the skid condition, the brake control unit may calculate an aircraft deceleration of the aircraft with the inertial sensor. The brake control unit may estimate the runway coefficient of friction based on the aircraft deceleration, an aerodynamic drag force of the aircraft, and a thrust reverse force of the aircraft.

20 Claims, 5 Drawing Sheets

ASSESSING RUNWAY SURFACE CONDITIONS

FIELD

The present disclosure relates to brake control systems, and more specifically, to detecting a coefficient of friction of a runway surface with a brake control system.

BACKGROUND

Aircraft often include one or more landing gear that comprise one or more wheels. Each wheel may have a brake, which is part of an aircraft braking system, that is operatively coupled to the wheel to slow the wheel, and hence the aircraft, during, for example, landing or a rejected takeoff. After landing, the aircraft braking system applies braking based on pilot input (e.g., via manual input, an autobrake setting, etc.) to reduce the speed of the aircraft. The wheels may skid relative to the runway surface in response to a braking pressure or autobrake deceleration value being too high for the runway conditions to support the braking pressure or autobrake deceleration value (e.g., a high deceleration value on an icy runway surface). Various airport authorities and personnel may desire to assess runway surface conditions to provide subsequently landing aircraft with a real time estimate of runway surface conditions.

SUMMARY

In various embodiments, a method for assessing runway conditions is disclosed. The method may comprise the steps of detecting, by a brake control unit (BCU), an aircraft braking event in an aircraft; monitoring, by the BCU, the aircraft braking event to detect a skid condition; calculating, by the BCU, an aircraft deceleration of the aircraft; and estimating, by the BCU, a runway coefficient of friction in response to detecting the skid condition, wherein the runway coefficient of friction is based on the aircraft deceleration, an aerodynamic drag force of the aircraft, and a thrust reverse force of the aircraft.

In various embodiments, the method may further comprise receiving, by the BCU, a global positioning system (GPS) location coordinates, and generating, by the BCU, a runway coefficient of friction map based on the runway coefficient of friction and the GPS location coordinates. In response to estimating a low runway coefficient of friction, the BCU may be configured to decrease braking force applied to wheels of the aircraft. The method may further comprise determining, by the BCU, the aerodynamic drag force, wherein the aerodynamic drag force is based on at least one of an aircraft speed data or an aircraft aerodynamic characteristics data. The aircraft speed data is determined by calculating an aircraft speed through wheel speed sensors on a wheel of the aircraft. The method may further comprise determining the thrust reverse force, wherein the thrust reverse force is based on an engine throttle angle position of the aircraft. The aircraft deceleration may be calculated by an inertial sensor in a brake control unit (BCU).

In various embodiments, a system for assessing a runway condition is disclosed. The system may comprise a wheel speed sensor coupled to a landing gear of an aircraft. The system may comprise a brake control unit (BCU). The brake control unit may perform operations comprising: detecting, by the BCU, an aircraft braking event in the aircraft; monitoring, by the BCU, the aircraft braking event to detect a skid condition; calculating, by the BCU, an aircraft deceleration of the aircraft; and estimating, by the BCU, a runway coefficient of friction in response to detecting the skid condition, wherein the runway coefficient of friction is based on the aircraft deceleration, an aerodynamic drag force of the aircraft, and a thrust reverse force of the aircraft.

In various embodiments, the system may further comprise a global positioning system (GPS) in electronic communication with the BCU, wherein the GPS is configured to transmit GPS location coordinates of the aircraft to the BCU. The operations may further comprise generating, by the BCU, a runway coefficient of friction map based on the runway coefficient of friction and the GPS coordinates. The operations may further comprise determining, by the BCU, the aerodynamic drag force, wherein the aerodynamic drag force is based on at least one of an aircraft speed data or an aircraft aerodynamic characteristics data. The aircraft speed data may be determined by calculating an aircraft speed through the wheel speed sensor. The operations may further comprise determining, by the BCU, the thrust reverse force, wherein the thrust reverse force is based on an engine throttle angle position of the aircraft. The aircraft deceleration may be calculated by an inertial sensor located within the BCU.

In various embodiments, a brake control unit (BCU) is disclosed. The BCU may comprise a processor, an inertial sensor in electronic communication with the processor, and a non-transitory, tangible computer readable storage medium in electronic communication the processor. The non-transitory, tangible computer readable storage medium may have instructions stored thereon that, in response to execution by the processor, cause the processor to perform operations comprising: detecting, by the processor, an aircraft braking event in an aircraft; monitoring, by the processor, the aircraft braking event to detect a skid condition; calculating, by the processor in electronic communication with the inertial sensor, an aircraft deceleration of the aircraft; and estimating, by the processor, a runway coefficient of friction in response to detecting the skid condition, wherein the runway coefficient of friction is based on the aircraft deceleration, an aerodynamic drag force of the aircraft, and a thrust reverse force of the aircraft.

In various embodiments, the BCU may further comprise a global positioning system (GPS) in electronic communication with the processor, wherein the GPS is configured to transmit GPS location coordinates to the processor. The operations may further comprise generating, by the processor, a runway coefficient of friction map based on the runway coefficient of friction and the GPS coordinates. The operations may further comprise determining, by the processor, the aerodynamic drag force, wherein the aerodynamic drag force is based on at least one of an aircraft speed data or an aircraft aerodynamic characteristics data. The aircraft speed data may be determined by calculating an aircraft speed through a wheel speed sensor on a wheel of the aircraft. The operations may further comprise determining, by the processor, the thrust reverse force, wherein the thrust reverse force is based on an engine throttle angle position of the aircraft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

Systems and methods for assessing runway conditions are disclosed. A brake control unit (BCU) may be configured to assess runway conditions by calculating a runway coefficient of friction (e.g., a ratio of the force of friction between one or more tires on one or more wheels of the aircraft and the runway surface). As used herein, "good" runway conditions may refer to a runway condition with a sufficiently high coefficient of friction such that wheels are able to spin up to a minimum reference speed. A good or uncontaminated runway may represent a runway that is dry and/or free of contaminants such as ice. A contaminated runway may have a lower coefficient of friction than an uncontaminated runway due to the contaminants. Moreover, different types of contaminants may cause different portions of the contaminated runway to have a different coefficient of frictions (e.g., an icy portion of the contaminated runway may have a lower coefficient of friction relative to a wet portion of the contaminated runway).

As discussed further herein, the BCU, via a global positioning system, may also combine the calculated runway coefficient of friction with location information to map the portion of the runway which the aircraft was on prior to braking. This information may be sent to airport personnel, and/or the like, to notify them that that corresponding portion of runway is contaminated. The airport personnel may combine this information to form a complete picture of runway conditions for the entire runway (or at least a partial portion of the runway). The runway conditions may be relayed to subsequently landing aircraft, or used to inform airport personnel that runway maintenance is desirable.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling").

Figure 1:
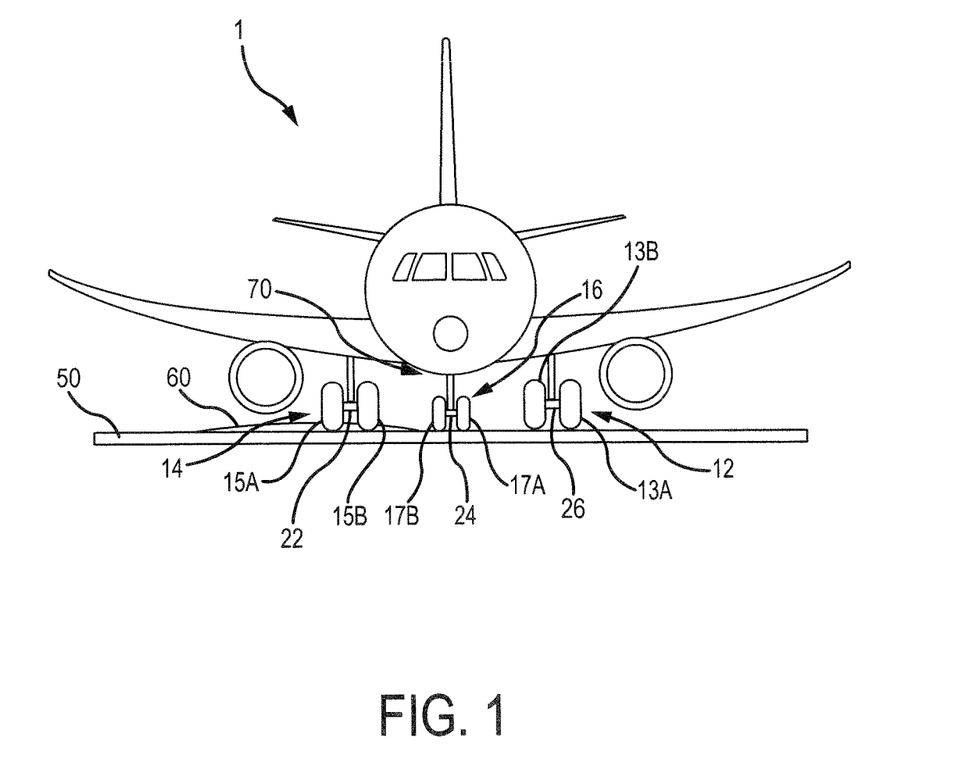
FIG. 1 illustrates a front view of an aircraft on a contaminated runway, in accordance with various embodiments.

In various embodiments, and with reference to FIG. 1, a front view of an aircraft 1 on a runway 50 is depicted. Aircraft 1 may include landing gear such as a left main landing gear (LMLG) 12, a right main landing gear (RMLG) 14, and a nose landing gear (NLG) 16. LMLG 12, RMLG 14, and NLG 16 may generally support aircraft 1 when aircraft 1 is not flying, allowing aircraft 1 to taxi, take off and land without damage. LMLG 12 may include a wheel 13A and a wheel 13B coupled by a strut 26; RMLG 14 may include a wheel 15A and a wheel 15B coupled by a strut 22; and NLG 16 may include a nose wheel 17A and a nose wheel 17B coupled by a strut 24. Wheel 13A and wheel 15A may be referred to as outboard wheels. Wheel 13B and wheel 15B may be referred to as inboard wheels. The nose wheels differ from the main wheels in that the nose wheels may not include a brake, in accordance with various embodiments. In various embodiments, aircraft 1 may comprise any number of landing gears and each landing gear may comprise any number of wheels.

Aircraft 1 may also include a primary braking system 70, which may be applied to any wheel of any landing gear. Braking system 70 of aircraft 1 may comprise a collection of subsystems that produce output signals for controlling the braking force and/or torque applied at each wheel (e.g., wheel 13A, wheel 13B, wheel 15A, wheel 15B, nose wheel 17A, and/or nose wheel 17B), together with various brakes, as discussed further herein. Braking system 70 may communicate with the brakes of each landing gear (e.g., LMLG 12, RMLG 14, and/or NLG 16), and each brake may be mounted to each wheel to apply and release braking force on one or more wheels (e.g., as described herein).

Aircraft wheel and brake assemblies may typically include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk stack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

In brake systems that employ fluid powered (hydraulic or pneumatic power) actuator rams, the actuator ram may be coupled to a power source via a brake servo valve (BSV) and a shutoff valve (SOV). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller is coupled to one or more electromechanical actuator controllers (EMAC) for a brake, which drives one or more electromechanical brake actuators. The brake controller may be in communication with a brake pedal, and thus may control the EMAC in accordance with pilot/copilot braking commands. In various aircraft, other means are used to compress a brake disk stack. A brake controller may comprise a processor and a tangible, non-transitory memory. The brake controller may comprise one or more logic modules that implement brake logic. In various embodiments, the brake controller may comprise other electrical devices to implement brake logic.

A controller as disclosed herein may include one or more processor. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Aircraft 1 is illustrated during spin up shortly after landing on runway 50. Spin up refers to the portion of landing during which friction between the landing surface and the wheels causes the wheels to accelerate. In various embodiments, runway 50 may comprise a contaminant 60. Contaminant 60 may comprise any substance which causes a decrease in the runway surface's coefficient of friction, and thus contaminant 60 may cause an aircraft wheel and/or aircraft tire to at least partially slip and/or skid on contaminant 60. For example, and in various embodiments, contaminant 60 may comprise ice, snow, water, jet fuel, oil, diesel fuel, a degraded runway surface due to potholes and/or other non-uniformities, and/or the like. In various embodiments, contaminant 60 may be a relatively slick portion of the pavement of runway 50 itself. In that regard, contaminant 60 may comprise any portion of runway 50 that has a different coefficient of friction than another portion of runway 50.

Figure 2:
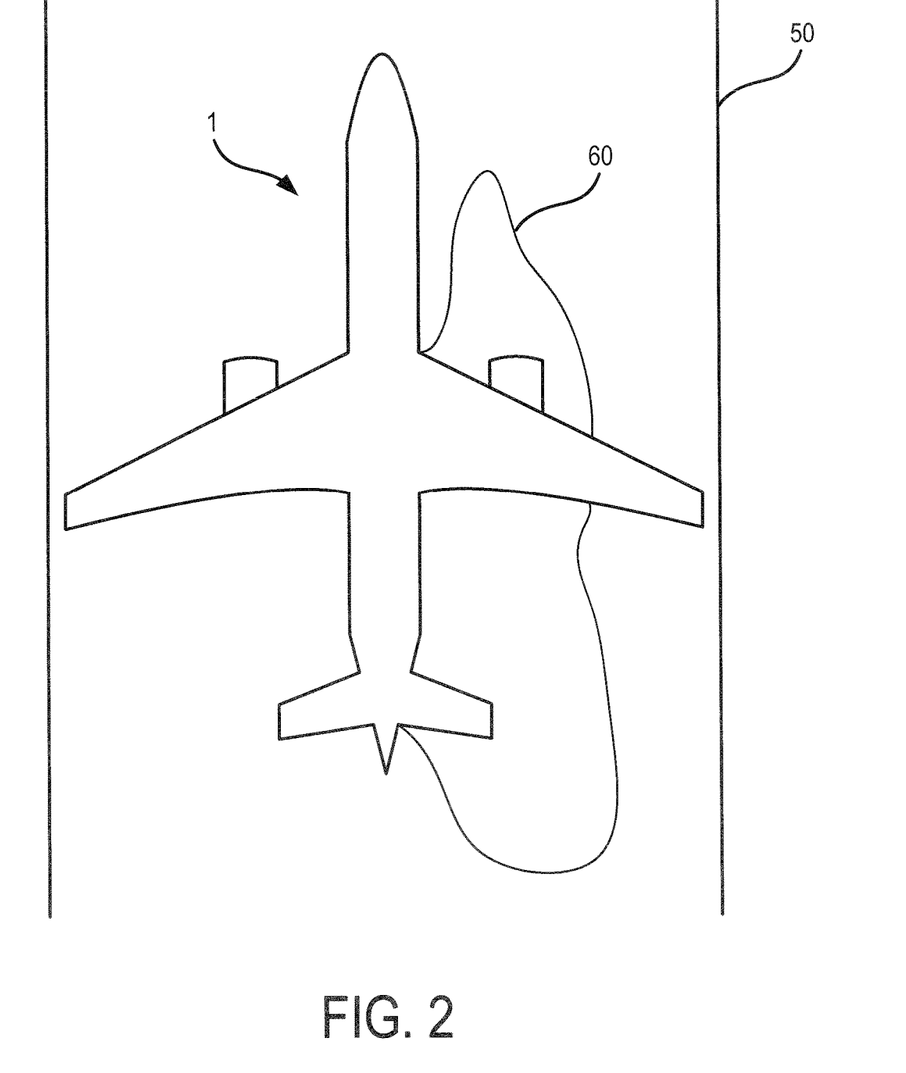
FIG. 2 illustrates a top view of an aircraft on a contaminated runway, in accordance with various embodiments.

Referring to FIG. 2, a top view of aircraft 1 on runway 50 is illustrated according to various embodiments. As illustrated, contaminant 60 may cover a portion of runway 50. Thus, in various embodiments, one or more aircraft wheels may be in contact with contaminant 60, while one or more aircraft wheels may be in contact with the pavement of runway 50. Different coefficients of friction of runway 50 and contaminant 60 may cause the aircraft wheels to spin up at varying rates. For example, and in various embodiments, the wheels of LMLG 12 may spin up faster than the wheels of RMLG 14 due to a higher coefficient of friction for runway 50 relative than contaminant 60. Different coefficients of friction of runway 50 and contaminant 60 may also cause the aircraft wheels to skid or lockup at varying levels. In various embodiments, runway 50 may comprise multiple contaminants, such as ice and snow, each with a different coefficient of friction. Moreover, one or more portions of runway 50 may comprise contaminant 60.

Figure 3:
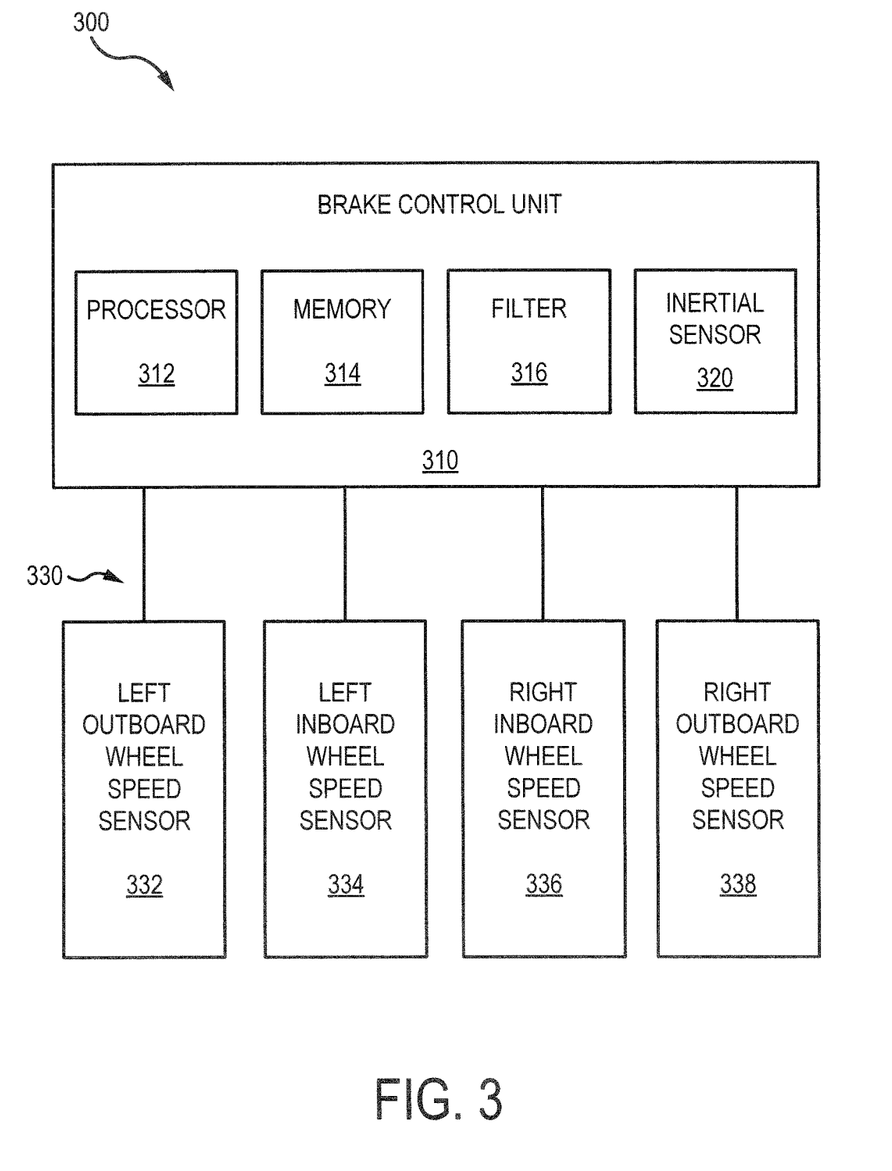
FIG. 3 illustrates a block diagram of a system for assessing runway conditions, in accordance with various embodiments.

In various embodiments, and with reference to FIG. 3, a system 300 for assessing runway conditions is depicted. System 300 may comprise a brake control unit (BCU) 310 in operative communication with one or more wheel speed sensors 330. For example, system 300 may comprise a left outboard wheel speed sensor 332, a left inboard wheel speed sensor 334, a right inboard wheel speed sensor 336, and a right outboard wheel speed sensor 338. In various embodiments, and with brief reference again to FIG. 1, LMLG 12 and RMLG 14 may each comprise four or more wheels, and a wheel speed sensors 330 may be coupled to each wheel of LMLG 12 and RMLG 14. For example, LMLG 12 and/or RMLG 14 may comprise a fore axle comprising a wheel speed sensor 330 coupled to each of an inboard wheel and an outboard wheel, and an aft axle comprising a wheel speed sensor coupled to each of an inboard wheel and an outboard wheel. The various components may be electrically coupled. In various embodiments, the various components may communicate via wireless communications. For example, wheel speed sensors 330 may wirelessly transmit wheel speed measurements to BCU 310.

In various embodiments, BCU 310 may comprise various components to aid in detecting runway conditions. For example, BCU 310 may comprise a computing device (e.g., processor 312) and an associated memory 314. Processor 312 may comprise any suitable processor, such as, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof. Memory 314 may comprise an article of manufacture including a tangible, non-transitory computer-readable storage medium having instructions stored thereon that, in response to execution by the computing device (e.g., processor 312), cause the computing device to perform various methods, as discussed further herein.

In various embodiments, BCU 310 may further comprise a filter 316 in electronic communication with processor 312. Filter 316 may be configured to filter data received from the wheel speed sensors. In various embodiments, filter 316 may comprise a low pass filter to reduce or eliminate high frequency noise. Filter 316 may further comprise a gear walk filter which may filter vibrations in a specific, narrow frequency range due to fore and aft oscillations of the landing gear. The frequency range may vary based on the aircraft structure. Generally, the frequency range may be higher for small aircraft and lower for large aircraft.

In various embodiments, BCU 310 may further comprise an inertial sensor 320 in electronic communication with processor 312. Inertial sensor 320 may be configured to determine an aircraft deceleration. Inertial sensor 320 may comprise any suitable type of inertial sensor capable of measuring aircraft deceleration, such as, for example, an accelerometer, a gyroscope, and/or a magnetometer. In various embodiments, inertial sensor 320 may also comprise microelectromechanical systems (MEMS). In this regard, inertial sensor 320 may comprise a MEMS accelerometer. Inertial sensor 320 may measure deceleration of aircraft 1. Inertial sensor 320 may measure deceleration of aircraft 1 in the fore/aft direction (i.e., the X-direction). Inertial sensor 320 may measure deceleration of aircraft 1 in the vertical direction (i.e., the Z-direction). Inertial sensor 320 may measure deceleration of aircraft 1 in the longitudinal direction (i.e., the Y-direction). Inertial sensor 320 may measure a deceleration of aircraft 1 and may report the deceleration of aircraft 1 to processor 312.

In various embodiments, each wheel speed sensor 330 may be configured to measure a raw wheel speed of the corresponding wheel. Wheel speed sensors 330 may comprise any device capable of measuring a raw wheel speed. For example, in various embodiments, wheel speed sensors 330 may comprise electromagnetic transducers or fiber optic transducers. In various embodiments, wheel speed sensors 330 may comprise an AC sensor which uses a magnet surrounded by a pickup coil in an axle of the landing gear. In various embodiments, wheel speed sensors 330 may comprise a DC sensor which may comprise a permanent magnet direct current generator, which outputs a voltage proportional to a rotational speed of its armature. Additionally, wheel speed sensors 330 may be configured to detect a change in a rate of deceleration of the wheels and may transmit a signal to BCU 310, which may determine whether braking pressure should be altered in order to assist in antiskid braking.

The raw wheel speed may comprise data indicating the actual measured speed of the wheel. In various embodiments, each wheel on aircraft 1 may be equipped with a wheel speed sensor 330. However, in various embodiments, aircraft 1 may comprise one wheel speed sensor per axle pair, one wheel speed sensor per gear, or may only comprise wheel speed sensors on the main landing gears. Wheel speed sensors 330 may transmit the raw wheel speed data to BCU 310. BCU 310, via processor 312, may calculate a reference wheel speed for each wheel. The reference wheel speed may be the over ground speed that the wheel would be travelling if the wheel were rolling without slipping. For example, if the wheel speed sensor measures a raw wheel speed of 10 radians per second for a wheel with a radius of 0.5 meters (1.6 feet), BCU 310 may calculate a reference wheel speed of 5 meters per second (11 mph). During spin up and subsequent braking, wheels may be at least partially slipping and/or skidding. Thus, the wheel reference speed may be less than the actual speed of aircraft 1 during spin up and braking.

Figure 4:
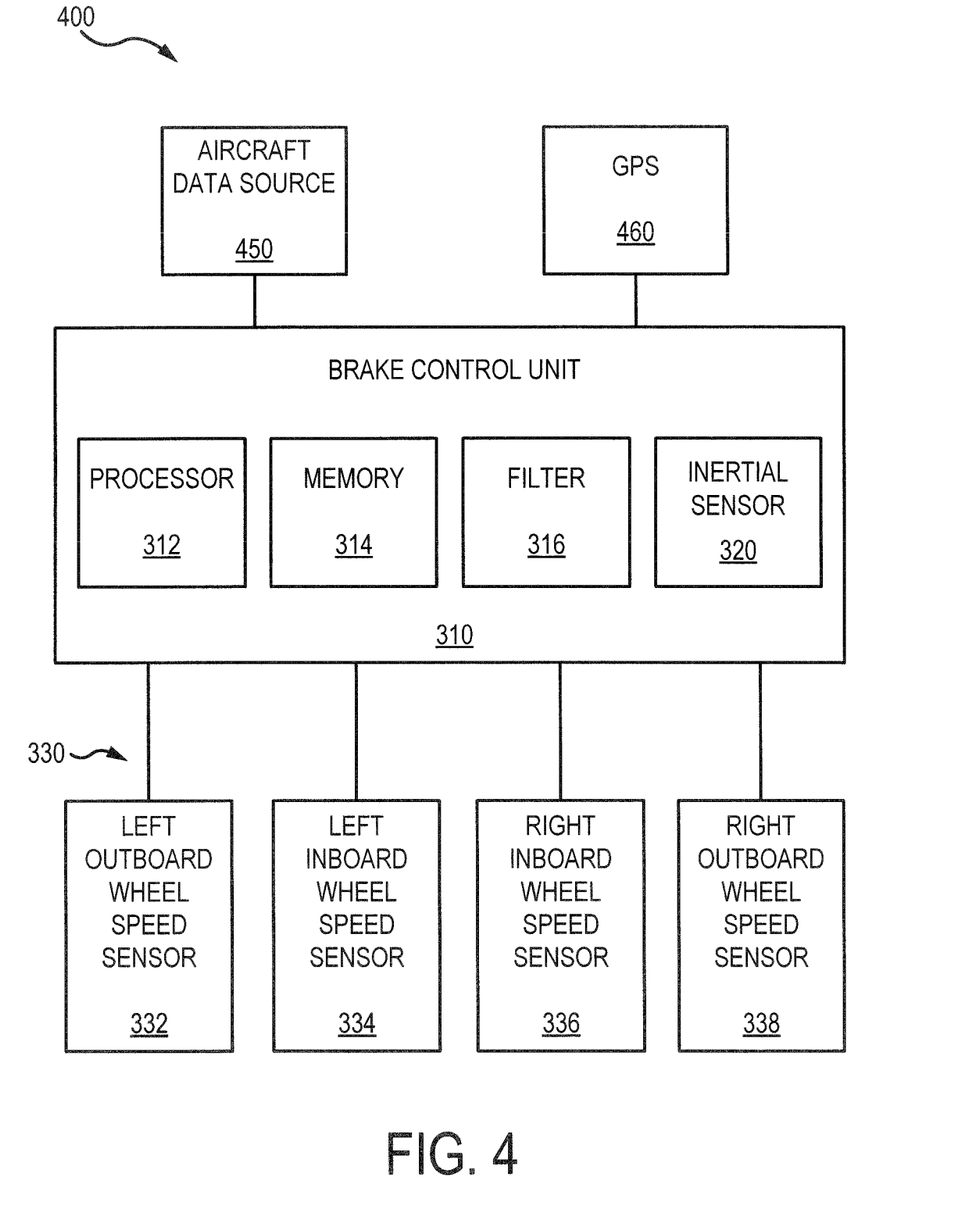
FIG. 4 illustrates a block diagram of a system for assessing runway conditions including a global positioning system (GPS) and an aircraft data source, in accordance with various embodiments.

In various embodiments, and with reference to FIG. 4, a system 400 for detecting runway conditions may further comprise an aircraft data source 450 and/or a global positioning system (GPS) 460. Aircraft data source 450 and GPS 460 may be electrically coupled to BCU 310. In various embodiments, aircraft data source 450 and GPS 460 may also be in wireless communication with BCU 310. Aircraft data source 450 may comprise one or more components in aircraft 1 configured to gather data related to aircraft 1, such as, for example, an avionics unit, a full authority digital engine control (FADEC), and/or similar such systems or components. Aircraft data source 450 may be configured to transmit the gathered data to BCU 310. Aircraft data source 450 may gather aircraft status information, such as, for example, the presence of weight on wheels, aircraft velocity, aircraft acceleration, aircraft speed information, aircraft aerodynamic characteristics, aircraft mass, engine throttle angle position, air temperature, and/or other suitable aircraft data. GPS 460 may comprise any suitable global positioning system, and may be configured to provide GPS location coordinates indicating the position of aircraft 1 on runway 50 (with brief reference to FIG. 1) in real time. For example, GPS 460 may transmit GPS location coordinates, aircraft location, aircraft position on a runway, and/or the like to BCU 310. In that respect, combining the GPS location coordinates with the coefficient of friction data in real time (e.g., to generate a runway coefficient of friction map) may allow for a complete picture of runway conditions to be obtained. This information may be utilized to inform incoming aircraft of the runway conditions on various portions of the runway in order to better prepare subsequent aircrafts for landing (e.g., a first portion of the runway may be icy, a second portion of the runway may be wet, and a third portion of the runway may be dry, etc.).

Figure 5:
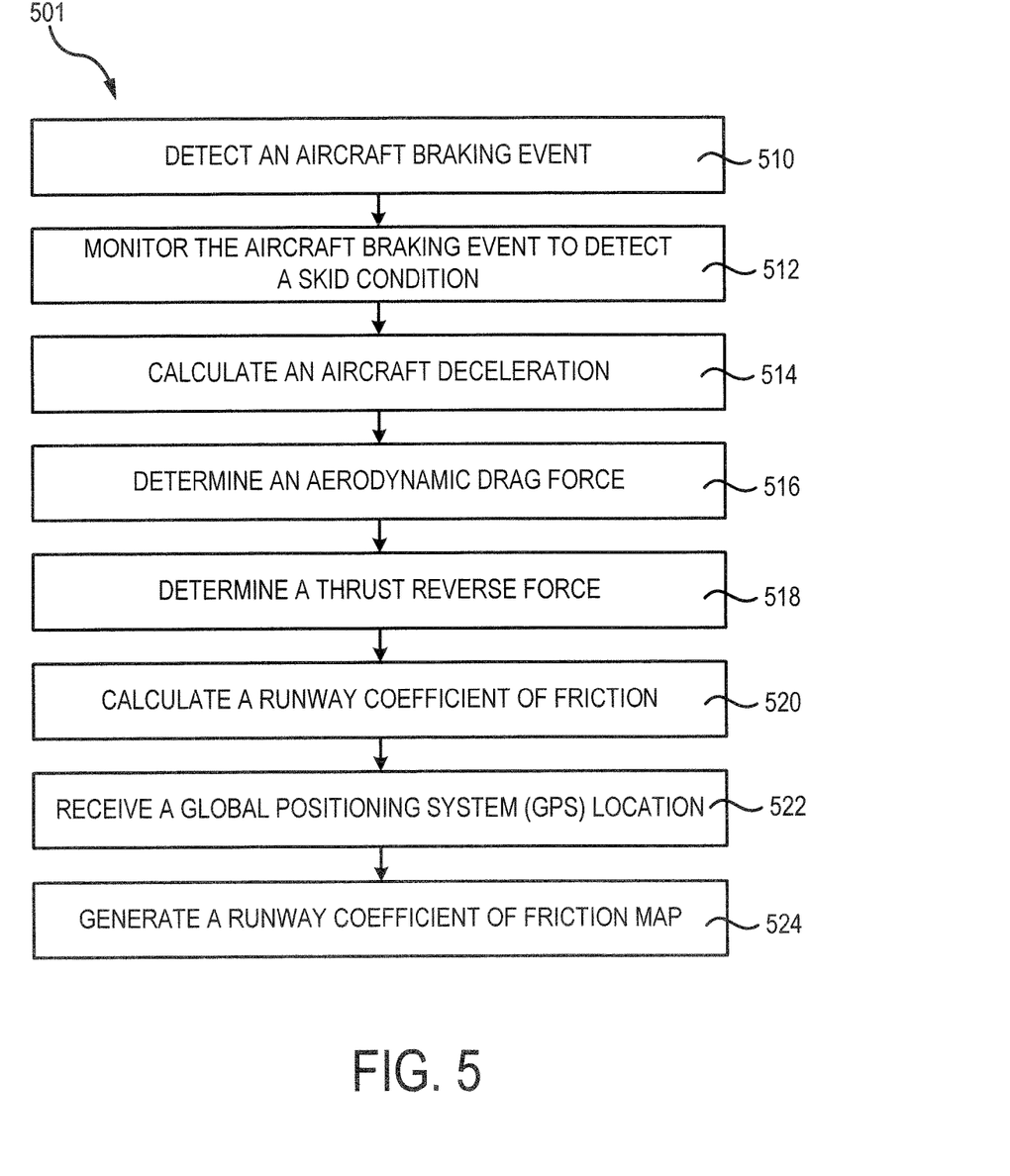
FIG. 5 illustrates a process flow of a method for assessing runway conditions, in accordance with various embodiments.

In various embodiments, and with reference to FIG. 5 and continued reference to FIG. 3, a method 501 for assessing runway conditions is illustrated. Method 501 may comprise detecting an aircraft braking event (step 510). BCU 310 may be configured to detect the aircraft braking event. For example, in response to aircraft 1 landing (e.g., at touchdown on runway 50), BCU 310 may receive a braking command from an autobrake system, a pilot, and/or the like, indicating a braking force to apply to each wheel. In response to applying the braking force, BCU 310 may indicate to processor 312 that the aircraft braking event has been detected. In various embodiments, method 501 may comprise monitoring the aircraft braking event to detect a skid condition (step 512). BCU 310 may be configured to detect a skid condition. For example, BCU 310, via processor 312, may be configured to receive raw wheel speed data from wheel speed sensors 330 or filtered wheel speed data from filter 316 indicating the current speed of each wheel in aircraft 1. Processor 312 may comprise anti-skid logic enabling processor 312 to analyze the wheel speed data and detect the skid condition. In that respect, in response to aircraft 1 decelerating on runway 50 and no skid condition is detected, the coefficient of friction may be above a coefficient of friction threshold (e.g., above about 0.60, and/or the like), indicating that runway 50 may comprise some contaminant 60, but not enough to degrade the coefficient of friction to a level of concern (e.g., a "good" runway condition).

In various embodiments, method 501 may comprise calculating an aircraft deceleration (step 514). In response to detecting the skid condition, BCU 310, via processor 312, may calculate the aircraft deceleration. In that respect, processor 312 may communicate with inertial sensor 320 to retrieve aircraft deceleration data. Inertial sensor 320 may be continuously, or at time intervals, determining aircraft deceleration data. Method 501 may comprise determining an aerodynamic drag force (step 516). BCU 310 may be configured to determine the aerodynamic drag force (e.g., the aerodynamic drag force being exerted on aircraft 1). For example, and in various embodiments, BCU 310 may communicate with wheel speed sensors 330 to retrieve raw wheel speed data (or communicate with filter 316 to retrieve filtered wheel speed data), and calculate an aircraft speed. In various embodiments, BCU 310 may also communicate with aircraft data source 450 to retrieve the aircraft speed. BCU 310 may communicate with aircraft data source 450 to retrieve aircraft aerodynamic characteristics with respect to the aircraft speed. BCU 310 may then determine the aerodynamic drag force based on the aircraft speed and the aircraft aerodynamic characteristics. Method 501 may comprise determining a thrust reverse force (step 518). BCU 310 may be configured to determine the thrust reverse force (e.g., the thrust reverse force provided by the engines of aircraft 1). For example, BCU 310 may communicate with aircraft data source 450 to retrieve an engine throttle angle position (e.g., the engine throttle angle position in aircraft 1). Processor 312 and/or memory 314 may comprise logic, data tables, and/or the like indicating the thrust reverse force corresponding to various engine throttle angle positions. In that respect, BCU 310 may determine the thrust reverse force based on the engine throttle angle position. In various embodiments, BCU 310 may also retrieve any other data points relevant to calculating the runway coefficient of friction, such as, for example, an aircraft mass during landing, the presence of weight on wheels, aircraft velocity, aircraft acceleration, and/or the like.

In various embodiments, method 501 may comprise calculating a runway coefficient of friction (step 520). BCU 310, via processor 312, may be configured to calculate the runway coefficient of friction. The runway coefficient of friction may be calculated based on the aircraft deceleration, an aerodynamic drag force of the aircraft, a thrust reverse force of the aircraft, and/or the aircraft mass. The runway coefficient of friction may be calculated in real time so that each calculated runway coefficient of friction corresponds to a portion of runway 50 in contact with aircraft 1, as discussed further herein. The runway coefficient of friction may generally correspond to the condition of runway 50. Good runway conditions may refer to a runway condition with a sufficiently high coefficient of friction such that wheels are able to spin up to a minimum reference speed. For example, a high coefficient above about 0.60 may indicate that the runway is not contaminated and is dry (e.g., a good runway condition). A good or uncontaminated runway may represent a runway that is dry and/or free of contaminants such as ice. A contaminated runway may have a lower coefficient of friction than an uncontaminated runway due to the contaminants. Moreover, different types of contaminants may cause different portions of the contaminated runway to have a different coefficient of frictions. For example, a low coefficient of friction of about 0.00 to about 0.10 may indicate the presence of ice; a low coefficient of friction of about 0.10 to about 0.20 may indicate the presence of snow; a low coefficient of friction of about 0.20 to about 0.50 may indicate that runway 50 is wet; and/or the like (e.g., collectively, a contaminated runway). In various embodiments, the calculated coefficient of friction value may be considered high or low dependent on variable operating considerations, including characteristics of the aircraft tire and/or runway 50 surface.

BCU 310 may transmit the runway coefficient of friction to airport personnel, the pilot, airport authorities, and/or the like for processing. In that respect, a pilot may use the runway coefficient of friction to determine the runway condition, and may vary braking force based on the runway condition. Similarly, airport personnel may use the runway coefficient of friction to alert subsequent aircraft of the condition of the runway, or may close the runway dependent on condition (e.g., in response to a low coefficient of friction deemed unsafe for landing). In various embodiments, BCU 310 may decrease braking force in response to detecting a low runway coefficient of friction. In that respect, BCU 310 may decrease braking force as an anti-skid measure or to ensure safety on runway 50.

In various embodiments, method 501 may comprise receiving a global positioning system (GPS) location (step 522). GPS 460 may be configured to determine the GPS location coordinates of aircraft 1, and transmit the GPS location coordinates to BCU 310. Method 501 may comprise generating a runway coefficient of friction map (step 524). BCU 310 may be configured to generate the runway coefficient of friction map. The runway coefficient of friction map may be based on the runway coefficient of friction and the GPS location coordinates. In that respect, the runway coefficient of friction map may comprise data indicating the calculated runway coefficient of friction for the portion of runway 50 corresponding to the GPS location coordinates. In various embodiments, the runway coefficient of friction map may be updated as aircraft 1 travels down runway 50 to at least partially map the portion of runway 50 that aircraft 1 travels on. BCU 310 may transmit the runway coefficient of friction map to airport personnel, the aircraft pilot, and/or any other suitable and/or desirable party.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for assessing a runway condition comprising:
   detecting, by a brake control unit (BCU), an aircraft braking event in an aircraft;
   monitoring, by the BCU, the aircraft braking event to detect a skid condition;
   calculating, by the BCU, an aircraft deceleration of the aircraft; and
   estimating, by the BCU, a runway coefficient of friction in response to detecting the skid condition, wherein the runway coefficient of friction is based on the aircraft deceleration, an aerodynamic drag force of the aircraft, and a thrust reverse force of the aircraft.

2. The method of claim 1, further comprising receiving, by the BCU, a global positioning system (GPS) location coordinates, and generating, by the BCU, a runway coefficient of friction map based on the runway coefficient of friction and the GPS location coordinates.

3. The method of claim 2, wherein in response to estimating a low runway coefficient of friction, the BCU is configured to decrease braking force applied to wheels of the aircraft.

4. The method of claim 1, further comprising determining, by the BCU, the aerodynamic drag force, wherein the aerodynamic drag force is based on at least one of an aircraft speed data or an aircraft aerodynamic characteristics data.

5. The method of claim 4, wherein the aircraft speed data is determined by calculating an aircraft speed through wheel speed sensors on a wheel of the aircraft.

6. The method of claim 1, further comprising determining the thrust reverse force, wherein the thrust reverse force is based on an engine throttle angle position of the aircraft.

7. The method of claim 1, wherein the aircraft deceleration is calculated by an inertial sensor in the brake control unit (BCU).

8. A system for assessing a runway condition, comprising:
   a wheel speed sensor coupled to a landing gear of an aircraft;
   a brake control unit (BCU), wherein the brake control unit performs operations comprising:
   detecting, by the BCU, an aircraft braking event in the aircraft;
   monitoring, by the BCU, the aircraft braking event to detect a skid condition;
   calculating, by the BCU, an aircraft deceleration of the aircraft; and
   estimating, by the BCU, a runway coefficient of friction in response to detecting the skid condition, wherein the runway coefficient of friction is based on the aircraft deceleration, an aerodynamic drag force of the aircraft, and a thrust reverse force of the aircraft.

9. The system of claim 8, further comprising a global positioning system (GPS) in electronic communication with the BCU, wherein the GPS is configured to transmit GPS location coordinates of the aircraft to the BCU.

10. The system of claim 9, wherein the operations further comprise generating, by the BCU, a runway coefficient of friction map based on the runway coefficient of friction and the GPS coordinates.

11. The system of claim 8, wherein the operations further comprise determining, by the BCU, the aerodynamic drag force, wherein the aerodynamic drag force is based on at least one of an aircraft speed data or an aircraft aerodynamic characteristics data.

12. The system of claim 11, wherein the aircraft speed data is determined by calculating an aircraft speed through the wheel speed sensor.

13. The system of claim 8, wherein the operations further comprise determining, by the BCU, the thrust reverse force, wherein the thrust reverse force is based on an engine throttle angle position of the aircraft.

14. The system of claim 8, wherein the aircraft deceleration is calculated by an inertial sensor located within the BCU.

15. A brake control unit (BCU), comprising:
   a processor;
   an inertial sensor in electronic communication with the processor;
   a non-transitory, tangible computer readable storage medium in electronic communication with the processor, the non-transitory, tangible computer readable storage medium having instructions stored thereon that, in response to execution by the processor, cause the processor to perform operations comprising:
   detecting, by the processor, an aircraft braking event in an aircraft;
   monitoring, by the processor, the aircraft braking event to detect a skid condition;
   calculating, by the processor in electronic communication with the inertial sensor, an aircraft deceleration of the aircraft; and
   estimating, by the processor, a runway coefficient of friction in response to detecting the skid condition, wherein the runway coefficient of friction is based on the aircraft deceleration, an aerodynamic drag force of the aircraft, and a thrust reverse force of the aircraft.

16. The BCU of claim 15, further comprising a global positioning system (GPS) in electronic communication with the processor, wherein the GPS is configured to transmit GPS location coordinates to the processor.

17. The BCU of claim 16, wherein the operations further comprise generating, by the processor, a runway coefficient of friction map based on the runway coefficient of friction and the GPS coordinates.

18. The BCU of claim 15, wherein the operations further comprise determining, by the processor, the aerodynamic drag force, wherein the aerodynamic drag force is based on at least one of an aircraft speed data or an aircraft aerodynamic characteristics data.

19. The BCU of claim 18, wherein the aircraft speed data is determined by calculating an aircraft speed through a wheel speed sensor on a wheel of the aircraft.

20. The BCU of claim 15, wherein the operations further comprise determining, by the processor, the thrust reverse force, wherein the thrust reverse force is based on an engine throttle angle position of the aircraft.

* * * * *